United States Patent [19]
>
> ## Smith et al.
>
> [11] 4,147,367
> [45] Apr. 3, 1979

[54] SHAFT SEAL FOR BEARING HOUSING

[75] Inventors: Larry C. Smith, New Berlin; Alan M. Nienhaus, Racine, both of Wis.

[73] Assignee: Rexnord Inc., Milwaukee, Wis.

[21] Appl. No.: 910,917

[22] Filed: May 30, 1978

[51] Int. Cl.² ............................................. F16J 15/32
[52] U.S. Cl. ................................. 277/152; 277/142; 277/186; 277/189; 277/178; 308/187.1
[58] Field of Search ................ 308/36.1, 187.1, 187.2; 277/47–50, 24, 25, 91, 92, 95, 96 R, 96.1, 102, 142, 143, 152, 165, 166, 133, 134, 178, 181, 186, 138, 188 R, 189, DIG. 4, 208

[56] References Cited

U.S. PATENT DOCUMENTS

| | | | |
|---|---|---|---|
| 2,523,604 | 9/1950 | Vedovell | 277/152 |
| 2,833,577 | 5/1958 | Reynolds | 277/24 |
| 3,510,138 | 5/1970 | Bowen et al. | 308/187.1 X |
| 3,658,395 | 4/1972 | Hallerback | 277/186 X |

FOREIGN PATENT DOCUMENTS

| | | | |
|---|---|---|---|
| 1050214 | 2/1959 | Fed. Rep. of Germany | 277/178 |
| 1021966 | 12/1952 | France | 277/189 |
| 1413029 | 11/1975 | United Kingdom | 277/142 |

Primary Examiner—Robert S. Ward, Jr.

[57] ABSTRACT

The seal closing the end of a housing of a bearing supporting a shaft is radially positioned by the shaft. The radially outer section of the seal which is retained within an annular groove of the housing is radially movable within the groove to allow such positioning and is in sealing engagement with the housing.

12 Claims, 10 Drawing Figures

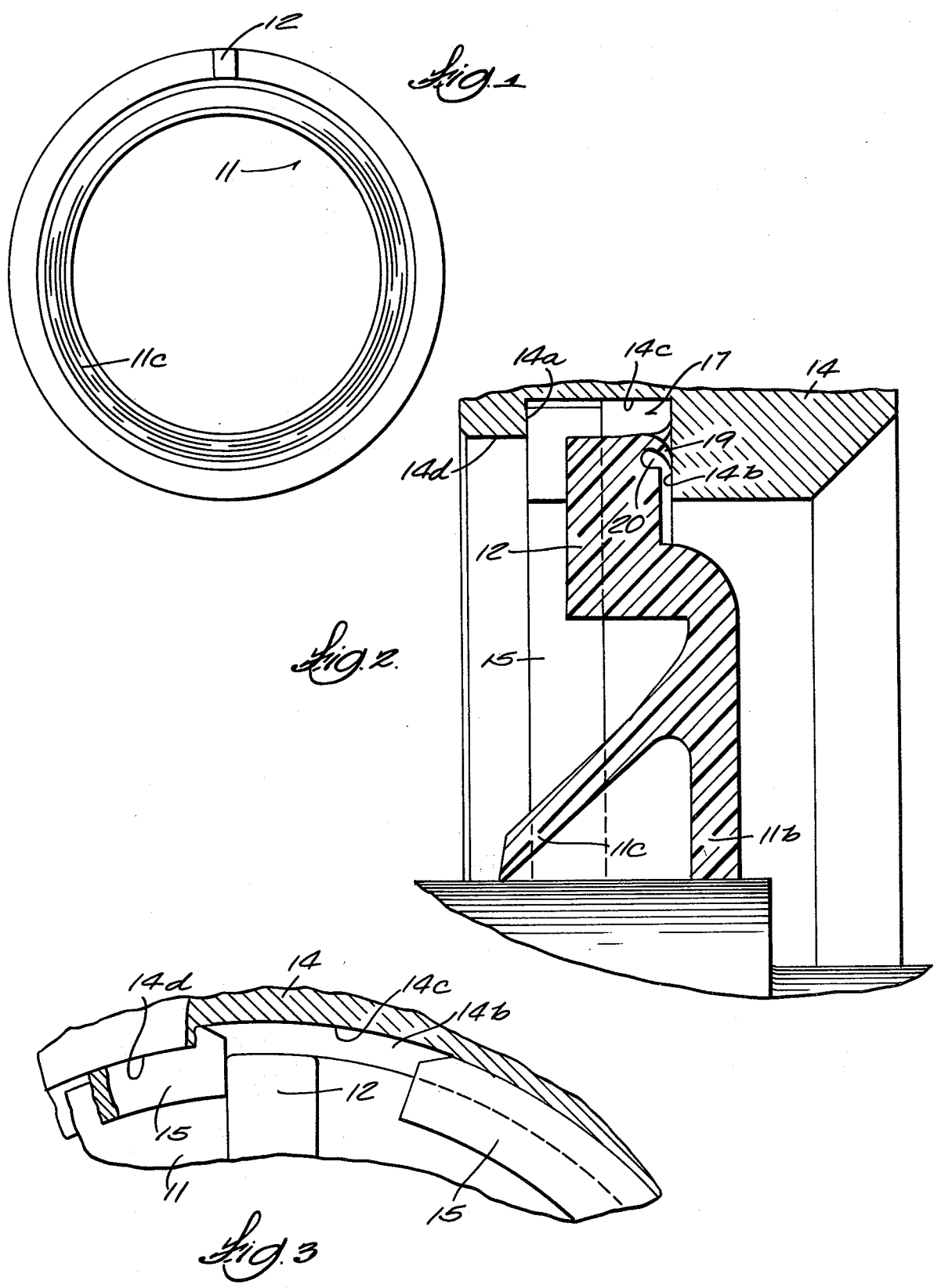

SHAFT SEAL FOR BEARING HOUSING

BACKGROUND OF THE INVENTION

Lubricant loss or foreign material entry around the outside diameter of a seal element or housing closure is generally accomplished by having a tight, close fit between the contacting parts. Such a fit, however, does not allow the entire seal to move radially or float in order to accommodate shaft misalignment. Shaft misalignment here is accomodated by deflection or movement of the shaft lip sealing element. The amount of misalignment that can be accomodated then is limited by the deflection capabilities of the lip.

Another means of allowing the seal to accommodate shaft misalignment is to provide a loose or clearance fit between the outside diameter of the seal element and the housing in which it is mounted. This allows the entire seal element to move or float radially to accomodate shaft misalignment and relieves the strain from the shaft lip. If the seal has a clearance fit oil or the grease which has become liquid will readily escape from the housing. Additionally, shaft rotation provides centrifugal forces to such lubricant that tends to cause the lubricant to flow radially outward and if a loose fitting outside diameter is used, then lubricant will be forced out beyond the seal.

A means of allowing the seal to float or move radially and still prevent lubricant from being forced out around the seal has been developed.

THE PRIOR ART

U.S. Pat. Nos. 2,619,369 and 3,162,456 show the type of bearing and bearing housing for which the seal of the present invention was designed. The outer bearing races are retained between members which partially close the ends of the housing. One such member comprises a threaded, removable ring which allows insertion of the bearing races. The seals are retained in annular grooves formed in the housing members. The bearings are the type which allow misalignment of the shaft relative to the outer bearing races. The seals shown are adapted to accommodate operational misalignment which causes the inner seal elements to gyrate with each shaft rotation. Misalignment may also be due only to the installation of the bearing which merely causes the seal to shift radially to another position to accommodate such misalignment. The seals shown in U.S. Pat. Nos. 2,367,403 and 4,039,197 are types which are more generally intended to accommodate installation misalignment. They have radially inner parts which radially engage and seal against the shaft and radially outer parts which axially engage and seal against the sides of the retaining member, such sides in effect defining retaining grooves for the respective seals. Both seals are characteristic of this type of seal in that they are of composite materials. One material provides the required overall rigidity and the other material provides the elasticity where required around the shaft and so that the seal is not or does not become loose in its mounting groove. More particularly, the seal must have and maintain a fit between the sidewalls of the groove which is at all times tight enough to prevent oil leakage but not so tight that the seal refuses to shift as required by the shaft and is instead distorted such that the seal around the shaft is lost. In U.S. Pat. No. 2,367,403, the center section (8) of the seal is compressible and biases the harder outer sections against the walls of the groove. In U.S. Pat. No. 4,039,197 the inner section (20) provides the required rigidity of the seal. The outer body is of an elastomeric material which can readily include the deformable lips (6,6') which engage the walls of the groove.

An object of the present invention is to provide a seal of injection molded unitary construction and of a material such that the entire seal has the required overall rigidity and includes an outer lip which at all times is tight enough in the groove to prevent leakage but not at any time too tight for radially shifting as may be required.

Most particularly, it is an object of the invention to provide a seal having an outer lip which is effective even though the sidewall of the groove it engages is a relatively rough machined surface.

SUMMARY OF THE INVENTION

A journal bearing for a shaft is of the type which does not require the shaft to be precisely aligned with the axis of the outer race of the bearing. The housing supporting the outer race contains a lubricant and a seal element is provided to close the housing and retain the lubricant. The inner lip of the seal element engages the shaft and the outer periphery of the element is fitted in an annular groove of the housing. A uniquely fine sealing at the outer periphery of the element engages the inner side of the groove with a fit which is tight enough to prevent the passage of lubricant around the outer periphery of the seal element but is loose enough to allow the outer periphery of the seal element to move radially in the groove whereby the seal element is radially positionable by the shaft. In particular, the outer sealing lip is effective even where the groove is only rough machined and its face has a typically rough surface over which the lip must slide and with which a closure must be maintained.

BRIEF DESCRIPTION OF THE SEVERAL VIEWS OF THE DRAWINGS

FIG. 1 shows the seal in front elevation;

FIG. 2 is an enlarged section of a part of the bearing housing and the shaft supported therein and shows the seal in section and as retained by a snap ring;

FIG. 3 is a section taken on line 3—3 of FIG. 2 and shows the lug which fits between the ends of the snap ring;

DESCRIPTION OF THE PREFERRED EMBODIMENT

The front face of seal 11 of the present invention is shown in full in FIG. 1. The front face refers to the side of the seal which is exposed in its mounted position as will be described and includes the single projecting lug 12 at the outer periphery of the face. The rear face of the seal is that which faces the interior of the bearing housing in its mounted position.

Figure 8:
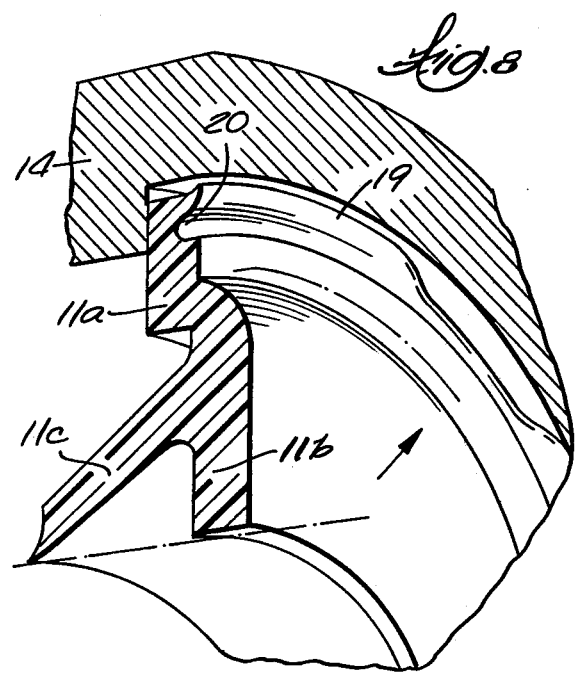
FIG. 8 is a perspective view showing portions of the seal lip deflected in opposite directions.

Seal 11 is of an integral, molded construction and the several portions are annular in form. As shown in FIGS. 2 and 8, the seal 11 includes a relatively flat outer portion 11a, the flat inner portion which will be referred to as the leg 11b and the conical inner portion which will be referred to as the shaft seal flange 11c.

The shaft seal flange 11c projects forwardly of the seal 11. To minimize the overall axial dimension of the seal, the flange extends from leg 11b and leg 11b is inwardly offset from the outer portion 11a.

Figure 5:
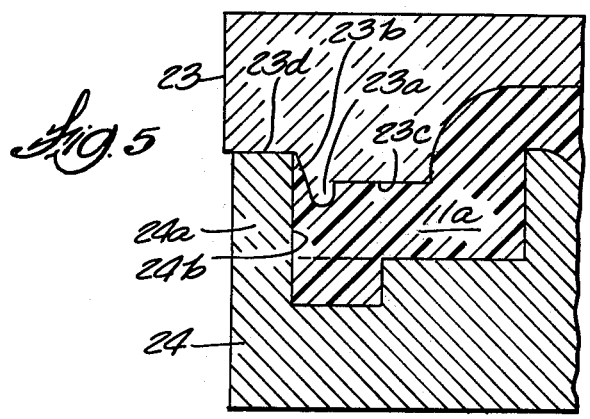
FIG. 5 shows in section a portion of the upper and lower parts of the mold in which the seal is formed.

Leg 11b has a uniform inner diameter which corresponds with the diameter of the shaft which it engages as will be described. In molding the seal as shown in FIG. 5, the radially inner tip of shaft seal flange 11c normally has a smaller circular dimension to fit moderately tightly the same shaft diameter as will be described. If the two shaft diameters referred to are different, the inner diameters of leg 11b and flange 11c should be correspondingly different.

Figure 4:
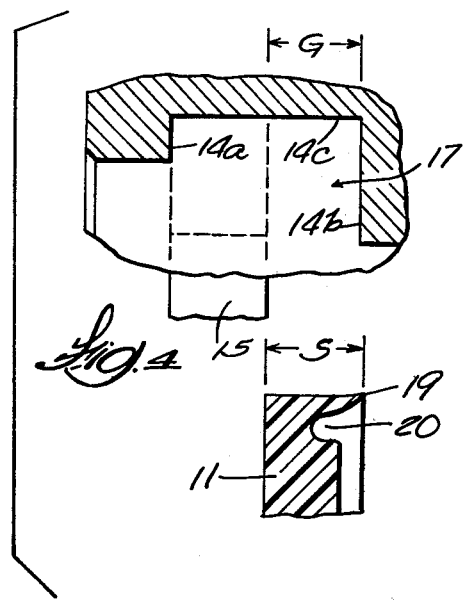
FIG. 4 shows the typical dimensions of the bearing housing groove and the sealing lip.

The mounting member 14 of the housing with which the seal is intended to be used is shown only in part and in section in FIGS. 2 and 8. As shown in FIG. 4, member 14 is machined so that an annular inwardly facing recess is defined by the oppositely machined surfaces 14a and 14b and the groove bottom 14c. Machining member 14 so that a precise distance between faces 14a and 14b is a relatively simple operation with ordinary tooling. The snap ring 15 which is then mounted in the recess referred to and immediate to face 14a is also of a precise width so that the groove 17 which is intermediate the snap ring and groove face 14b is similarly of a precise width. A typical width G of groove 17 as shown in FIG. 4 is 0.062 inches ±0.003 (1.57 mm ±0.08).

Seal 11 is inserted, of course, before the snap ring is inserted. The internal diameter of the member 14 at its opening 14d adjacent to the groove face 14a is just slightly larger than the seal to allow seal 11 to be inserted in groove 17. The snap ring 15 is then compressed for insertion as described and is inserted so that the lug 12 of seal 11 lies between the spaced ends of snap ring 15.

It should be noted that a generous clearance appears between the outer periphery of seal 11 and the bottom 14c of the machined recess or more specifically the bottom of the groove 17. Further, face 14b of member 14 extends radially inwardly and preferably to the radially inner circumference of snap ring 15 so that lip 19 of the seal is in full contact with face 14b in any position allowed by the clearance referred to. The function of lug 12 is to engage either end of the snap ring as shown in FIG. 3 for example so that rotation of the seal with the shaft is prevented. It should be noted also that the front side of the outer portion 11a of seal 11 is unsupported where it spans the gap between the ends of the snap ring 15.

The present invention is directed to the improved sealing lip 19 which projects from the rear face of seal 11 and is provided to engage the face 14b of mounting member 14. Lip 19 is located at the radially outer periphery of the outer portion 11a of the seal and the annular recess 20 in the rear face thereof adjoins lip 19. The remarkably small actual size of lip 19 may be noted. A typical dimension 5 which is the width of the seal including the lip is 0.069 inches ±0.004 (1.75 mm ±0.10).

The outer peripheries of the upper and lower parts 23 and 24 respectively of the die for injection molding the seal are shown in FIG. 5. The ridge 23a extending downwardly into the cavity of lower part 24 forms the recess 20 of seal 11 and joins the conical outer surface 23b and the flat peripheral lower face 23c of mold part 23. There is also a minute radius or fillet between surface 23b and the outer lower face 23d of mold part 23. The outer wall 24a of lower part 24 has an annular or cylindrical inner surface 24b which extends up to the flat peripheral upper face 23d of mold part 24. There is a minimally rounded corner between surface 24b and upper face 23d.

Figure 6:
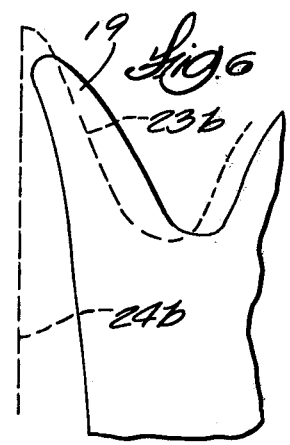
FIG. 6 is an enlarged section of the lip seal in outline. The seal is shown as molded by the broken lines. The figure shows the lip having a radially outward flare which is due to the greater radial contraction of the body of the seal in cooling after molding.

The material of the seal is injected through several circumferentially spaced ducts, not shown. Upon cooling and removal of seal 11 from the mold, the lip 19 extends from outer portion 11a axially as molded but also slightly radially outwardly as shown in FIG. 6. In FIG. 6, the corresponding surfaces of the mold are shown in broken lines. This effect is due to the greater radial shrinkage of the flat portion 11a and leg 11b of the seal. Because of the relatively small size of lip 19, this effect is observable but is not believed to affect adversely the functioning of the lip according to the invention.

The seal 11 is of unitary, molded elastomeric construction. Different functions are required of the several different portions of the seal and determine the molding material selected and its hardness. Generally, the material must be impervious to and unaffected by the lubricant it is to retain and sufficiently rigid so as not to be easily pushed in or out or sag or be deformed by the shaft movements it is to accommodate. A black copolyester sold under the trademark Hytrel 5555 of a durometer hardness of about 55D has been found to be suitable. Such a hardness still allows adequate flexibility of the two sealing lips of the seal as is required but does not allow the seal to sag where it spans the spaced ends of the snap ring 15. Such a hardness is also believed required because of the small size of lip 19. A small size is here considered to be in the order of 0.04 inches (0.30 mm) measured from its root to its tip.

Figure 7A:
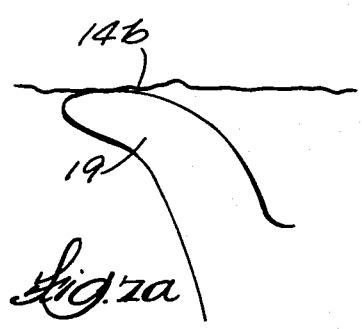
FIGS. 7a, 7b, and 7c are further enlarged views and show sections of the lip in outline and as deflected by the rough machined surface of the housing. The lip is deflected radially outwardly in FIG. 7a and radially inwardly in FIG. 7c. The intermediate or transition section in FIG. 7b is compressed in a "column loaded" manner as shown.
Figure 7B:
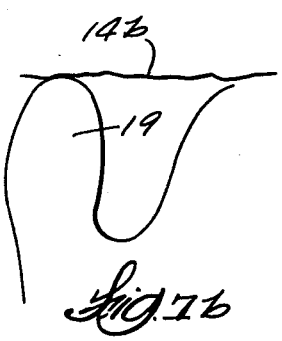
Figure 7C:

A durometer hardness of about 55D and the particularly small size of the lip 10 are believed to be essential to the success of the seal in maintaining a seal-closure throughout its entire circumference. The explanation is believed to be in the fact that the lip is uniquely able to be deflected not only in either direction but can be compressed edgewise as well. This is illustrated in FIGS. 7a, 7b, and 7c. In FIG. 7a, the lip is deflected radially outwardly by the rough surface 14b of the bearing housing member 14. In FIG. 7c, lip 19 is deflected radially inwardly. As shown in FIG. 7b, lip 19 is compressed in the manner of being "column loaded."

When the seal 11 is initially installed in groove 14, the lip may or may not be but is generally likely to be deflected radially outwardly over its entire length or circumference. However, as seal 11 is repositioned as shown in FIG. 8 and in the radial direction indicated by the arrow, some portion of lip 19 which was deflected in the direction of movement is folded back or deflected as shown in FIG. 7c. When that occurs, there are two intermediate or transition portions of the lip which are twisted and are likely to push the seal away from the sealing surface such that slight gaps develop through which the lubricant can leak.

According to the present invention, lip 19 as in FIG. 7b does not push the seal away from the sealing surface, such gaps do not develop and such leakage does not occur. The capability of lip 10 to maintain a complete closure with respect to surface 14b is thus provided in a seal which is entirely molded of one selected material.

With reference to the width G of the groove and the width S of the seal which have been specified, if G is minimum and S is maximum, the maximum deflection of lip 10 will occur and also the compression shown in FIG. 7b. If G is maximum and S is minimum, the tip of lip 10 should contact surface 14b. Thus, a balance between flexibility and stiffness must be provided and is provided according to the invention.

We claim:

1. An end seal for insertion in the annular groove of a shaft bearing housing wherein the width of the groove is within close tolerances of such as 0.003 inches (0.16 mm) and some shaft angularity or eccentricity must be accommodated initially by radial movement of the seal, such a groove having opposite parallel annular faces including a rear face nearer the interior of the housing and a forward face nearer the end of the housing, said seal being of a molded material having a Durometer hardness of in the order of 55D and comprising:
    (a) a radially inward section having a running and sealing fit with the shaft and
    (b) a radially outer body having
        (1) a forward face to engage the forward face of the groove and including forward means engageable with the housing to prevent rotation of the seal with the shaft,
        (2) a lip at the rear and radially outward corner of the seal body, said lip extending axially to engage the rear face of the groove and being of a length in the order of 0.04 inches (0.30 mm) such that different portions may be leaned radially inwardly and outwardly and the intermediate folded portions maintain a sealing engagement with the rear face of the groove.

2. The combination which includes the seal of claim 1 and a metal snap ring having spaced ends, said snap ring being adapted to be inserted in the groove of the housing such that one side thereof then forms the forward face of the groove referred to, said seal body having a forward projection which when disposed between the ends of the snap ring comprises therewith said forward means engageable with the housing to prevent rotation of the seal with the shaft.

3. A bearing housing having an annular groove at one end thereof, a snap ring fitted in said groove and having spaced ends, the dimensional tolerance between the rear side of the snap ring and the rear face of the groove being in the order of 0.003 inches (0.16 mm), and a shaft seal having a radially outer body radially movable between said rear side of the snap ring and rear face of said groove and having a Durometer hardness of in the order of 55D and comprising:
    (a) a radially inward section having a running and sealing fit with the shaft and
    (b) said radially outer body including
        (1) a forward face to engage the rear side of the snap ring and including a forward projection extending between the ends of the snap ring to prevent rotation of the seal with the shaft,
        (2) a lip at the rear and radially outward corner of the seal body, said lip extending axially to engage the rear face of the groove and being of a length in the order to 0.04 inches (0.30 mm) such that different portions may be leaned radially inwardly and outwardly and the intermediate folded portions maintain a sealing engagement with the rear face of the groove.

4. The seal of claim 1 wherein the tip of the lip extends radially of the seal.

5. The seal of claim 1 wherein the outer body includes an annular rearward groove between the lip and the rear side of the seal body, said rear side being offset from the tip of the lip a fraction only of the length of the lip so as to protect the latter against excessive deformation.

6. The seal of claim 4 which is of a two-part molded construction an the flash which is normal in such construction comprises the tip of the lip.

7. The combination of claim 2 wherein the tip of the lip of the seal extends radially thereof.

8. The combination of claim 6 wherein the seal is of a two-part molded construction and the flash which is normal in such construction comprises the tip of the lip.

9. The combination of claim 2 wherein the outer body of the seal includes an annular rearward groove between the lip and the rear side of the seal body, said rear side being offset from the tip of the lip a fraction only of the length of the lip so as to protect the latter against excessive deformation.

10. The bearing housing of claim 3 wherein the tip of the lip extends radially of the seal.

11. The bearing housing of claim 10 wherein the seal of a two-part molded construction and the flash which is normal in such construction comprises the tip of the lip.

12. The bearing housing of claim 3 wherein the outer body of the seal includes an annular rearward groove between the lip and the rear side of the seal body, said rear side being offset from the tip of the lip a fraction only of the length of the lip so as to protect the latter against excessive deformation.

* * * * *